Nov. 16, 1926.

D. H. BOTTRILL

SOLDERING DEVICE

Filed March 23, 1926

1,607,508

Inventor
D. H. Bottrill
by Fetherstonhaugh & Co.
Attys.

Patented Nov. 16, 1926.

1,607,508

UNITED STATES PATENT OFFICE.

DAVID HUGHES BOTTRILL, OF TORONTO, ONTARIO, CANADA.

SOLDERING DEVICE.

Application filed March 23, 1926. Serial No. 96,859.

My invention relates to improvements in soldering devices, and the object of the invention is to devise simple means whereby the ends of two wires may be easily and quickly soldered together, and it consists essentially of the arrangement and construction of parts as hereinafter more particularly explained.

In the drawing like characters of reference indicate corresponding parts in each figure.

1 and 2 indicate a pair of handles pivotally connected together at 3 in scissor formation and provided with arms 4 and 5 extending therefrom in a parallel direction.

6 and 7 are mould members carried by the arms 4 and 5 and provided in their abutting faces with concavities 8 and 9 registering one with the other to form a complete solder receiving cavity.

Figure 1:
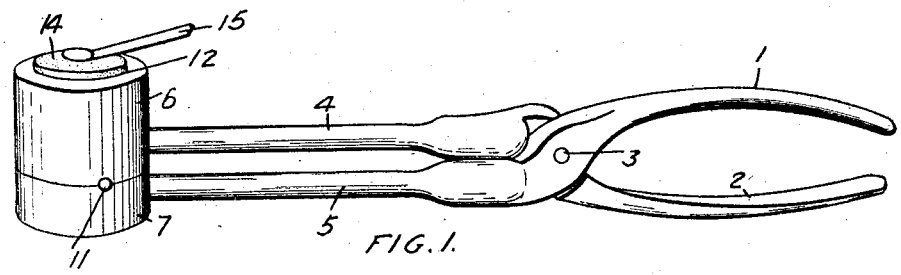
Fig. 1 is a perspective view of my device.
Figure 2:
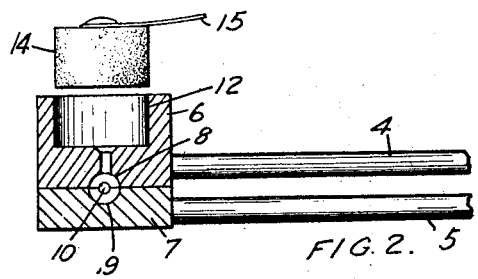
Fig. 2 is a sectional view through my device showing the cartridge removed therefrom.
Figure 3:
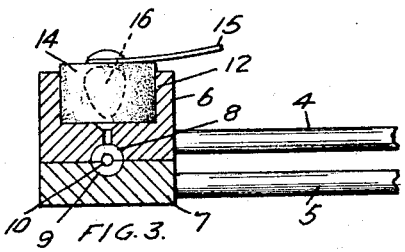
Fig. 3 is a similar view to Figure 2 showing the cartridge in position.
Figure 4:
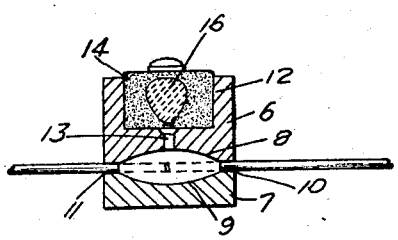
Fig. 4 is a sectional view through my device taken at right angles to the sectional view illustrated in Figure 3.

10 and 11 are small orifices formed half in the mould member 7 and half in the mould member 6 and into which the ends of the wire are adapted to be inserted so as to be gripped between the mould members 6 and 7 and held in an abutting position as indicated by dotted lines in Figure 4.

12 is a recess formed in the mould member 6 extending down from the upper face thereof and from which extends a small orifice 13 leading into the solder receiving cavity.

14 is a cartridge to which is suitably attached a fuse 15. The cartridge 14 is formed of suitable intense heat producing mixture such as, magnesia, oxide of iron, aluminum oxide and potassium nitrate, in the centre of which is located a body of soldering material 16 which is preferably heart shaped, the point of the heart extending directly over the orifice 12 so that when such soldering material is fused it will readily pass down through such orifice.

When it is desired to solder two wire ends together such ends are brought into abutment and placed between the mould members 6 and 7 so as to be gripped in the orifices 10 and 11 and extend through the cavity formed by the concavities 8 and 9. When this is done the fuse 15 is ignited and the cartridge thereby ignited producing intense heat which fuses the soldering material 16 which flows down through the orifice 13 into the solder receiving cavity around the wire ends extending therethrough.

The solder receiving cavity is preferably formed cylindrical in cross section tapering towards each end so that when the solder encloses the wire ends a wipe joint is formed.

From this description it will be seen that I have devised a very simple and quick means for soldering two wire ends together to form a neat and secure joint.

What I claim as my invention is:

In a soldering device, a pair of opposing mould members having opposing cavities in their opposing faces and opposing half orifices extending from each end of the cavity through which wire ends are adapted to extend to pass transversely of the cavity, and means for holding an ignitable fusing means and a body of fusible material on the mould whereby when fused said material will flow from said fusing means directly into the cavity to surround the wire ends.

DAVID HUGHES BOTTRILL.